UNITED STATES PATENT OFFICE.

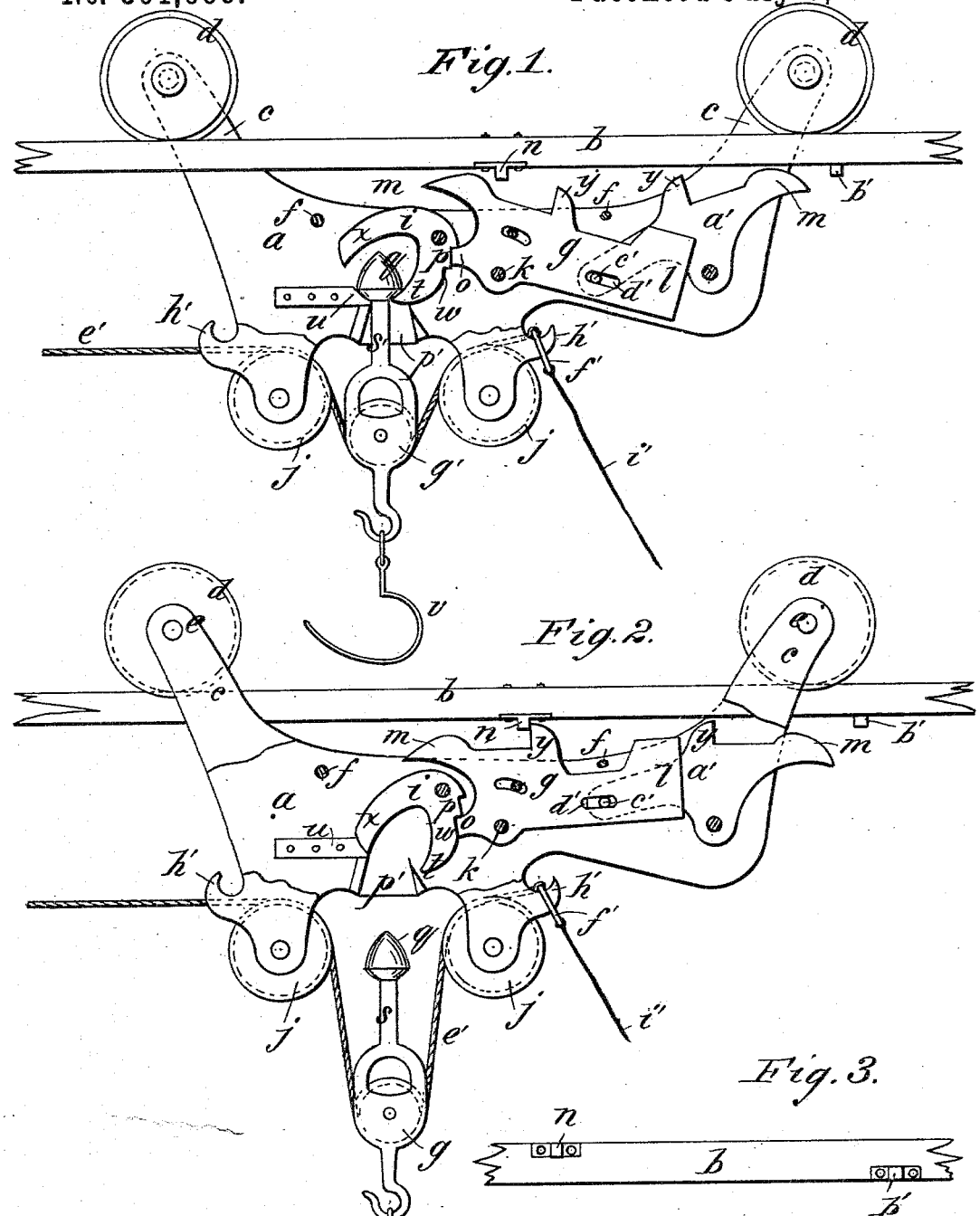

ABNER J. BURBANK, OF HARVARD, ILLINOIS.

HAY ELEVATOR AND CARRIER.

SPECIFICATION forming part of Letters Patent No. 301,666, dated July 8, 1884.

Application filed August 25, 1883. (No model.)

*To all whom it may concern:*

Be it known that I, ABNER J. BURBANK, of Harvard, in the county of McHenry and State of Illinois, have invented a new and Improved Hay Elevator and Carrier, of which the following is a full, clear, and exact description.

This invention pertains to improvements in hay elevators and carriers; and it consists of the several combinations and arrangements of parts, substantially as hereinafter fully set forth and claimed.

Reference is to be had to the accompanying drawings, forming part of this specification, in which similar letters of reference indicate corresponding parts in all the figures.

Figure 1 is a side elevation of my improved machine with one of the sides of the carrier broken out, showing the fork raised and secured and the carrier tripped ready to be run from the place of hoisting along the beam to the place of discharging the load; and Fig. 2 is a side elevation of the machine, also with one of the sides of the carrier broken out, showing the fork detached from the carrier and descending for a load, the carrier being secured in the position for hoisting. Fig. 3 is a detail of the beam on which the carrier runs.

The frame of the carrier consists of the two plates $a$, suspended edgewise under the beam $b$ by arms $c$, extending up the sides of the beam and connected to the axles $e$ of the wheels $d$, fitted to roll along the beam, said plates $a$ being connected together under the beam by rods or bolts $f$, with space between them for the levers $g$ $a'$, dog $i$, and the sheaves $j$, constituting the mechanism of the machine. The lever $g$ is pivoted at $k$ between said plates, and it has a weighted arm, $l$, which overbalances the other end and holds it up in the position represented in Fig. 1, when not held down, as in Fig. 2, by the dog $i$. Said lever $g$ also has a curved or cam-shaped arm, $m$, which runs against the stud $n$ on the under side and front edge of the beam $b$ when the carrier runs back to the place of hoisting, and is forced down thereby, so that the stop $o$ of said lever drops out of notch $p$ of dog $i$, allowing the dog to swing back by the downward pull of the oval head $q$ of the fork-shaft $s$, which thus opens the space for the escape of the head $q$ from between the prong $t$ of the dog and the end of the cleat $u$. The fork $v$ then descends for its load, and the stop $o$ is caught in the lower notch, $w$, of the dog $i$. The upper arm, $x$, of the dog then swings down on the end of cleat $u$, where it is held so that the weighted arm $l$ of the lever $g$ is held up, as represented in Fig. 2, causing the projecting catch $y$ of the upper edge of the lever to engage with stud $n$ and hold the carrier in position until the loaded fork is raised. The head $q$ of the fork-shaft then strikes arm $x$ of dog $i$, throwing said arm up and thrusting prong $t$ down under the head, and at the same time tripping notch $w$ from stop $o$, allowing catch $y$ to fall clear of stud $n$, and at the same time stop $o$ catches dog $i$ in the notch $p$, which locks and secures the fork by the head $q$, the lever $g$ swinging up sufficiently to be thrust down again by stud $n$, for again letting the fork fall when it returns from the discharging-place again.

As above described, the machine is adapted for carrying and discharging the load to the left hand of the place of elevating the same.

For enabling the carrier to work the other way or to the right hand without shifting the carrier on the beam or altering the working-rope, I have provided another lever, $a'$, having a curved arm, $m$, and catch $y$, together with another stud, $b'$, on the beam, which cause the lever $g$ and the dog $i$ to operate the same when the carriage is pulled to the right as when pulled the other way, the arm $m$ and the catch $y$ of this lever $a'$ being arranged with the same relation to the right-hand direction as the same parts of lever $g$ are to the left-hand direction, the lever $a'$ and its stud $b'$ being arranged in a different plane from that of lever $g$ and its stud $n$, and the levers $a'$ and $g$ being connected together by the stud-pin $c'$ and slot $d'$, so that, in effect, the lever $g$ is affected just the same by the stud $b'$ as it is by stud $n$. The hoisting-rope $e'$ has a ring, $f'$, on each end, and it runs through the sheaves $j$ and $g'$ from end to end when pulled to reverse the direction in which the carrier is to work, the ring in the end stopping the rope thereat from running between the plates $a$, and said rings are also engaged with hooks $h'$, to prevent them from turning up edgewise. A cord, $i'$, is connected to each ring $f'$ for use in engaging the rings with the hooks $h'$, and also for pulling the carrier back.

The carrier is constructed with a kind of bell-mouthed entrance at $p'$ for guiding the head $q$ to the locking-dog $i$ and insuring its proper entry thereto. It will be seen that I am thus enabled to run the carrier in either direction with a very simple arrangement of apparatus; also, that the locking and tripping gear is simple and efficient.

Having thus described my invention, what I claim as new, and desire to secure by Letters Patent, is—

1. The weighted lever $g$, having stop $o$, curved arm $m$, and catch $y$, in combination with dog $i$, having arm $x$, prong $t$, and notches $p\ w$, and with the fork-head $q$ and stud $n$, substantially as described.

2. The lever $a'$, having curved arm $m$ and stud $y$, in combination with lever $g$, having stop $o$, and with dog $i$, having arm $x$, prong $t$, and notches $p\ w$, also with fork-head $q$ and stud $b'$, substantially as described.

3. The combination of dog $i$, having arm $x$, prong $t$, and notches $p\ w$, lever $g$, having stop $o$, and the fixed cleat $u$, with the fork-head $q$, substantially as described.

4. The lever $a'$ and stud $b'$, in combination with lever $g$, dog $i$, and the fork-head $q$, the lever $g$ having the arm $m$ and catch $y$, and provided with the stud $n$, and the connected lever $a'$ also having an arm, $m$, and catch $y$, and being provided with a stud, $b'$, the said levers and studs being arranged in different planes, whereby the carriage may be worked in opposite directions without interference of the said levers and studs, substantially as described.

ABNER J. BURBANK.

Witnesses:
 FRANK BALLARD,
 H. B. MINIER.